J. DRUECKER.
LIMEKILN.
No. 10,214. Reissued Oct. 10, 1882.
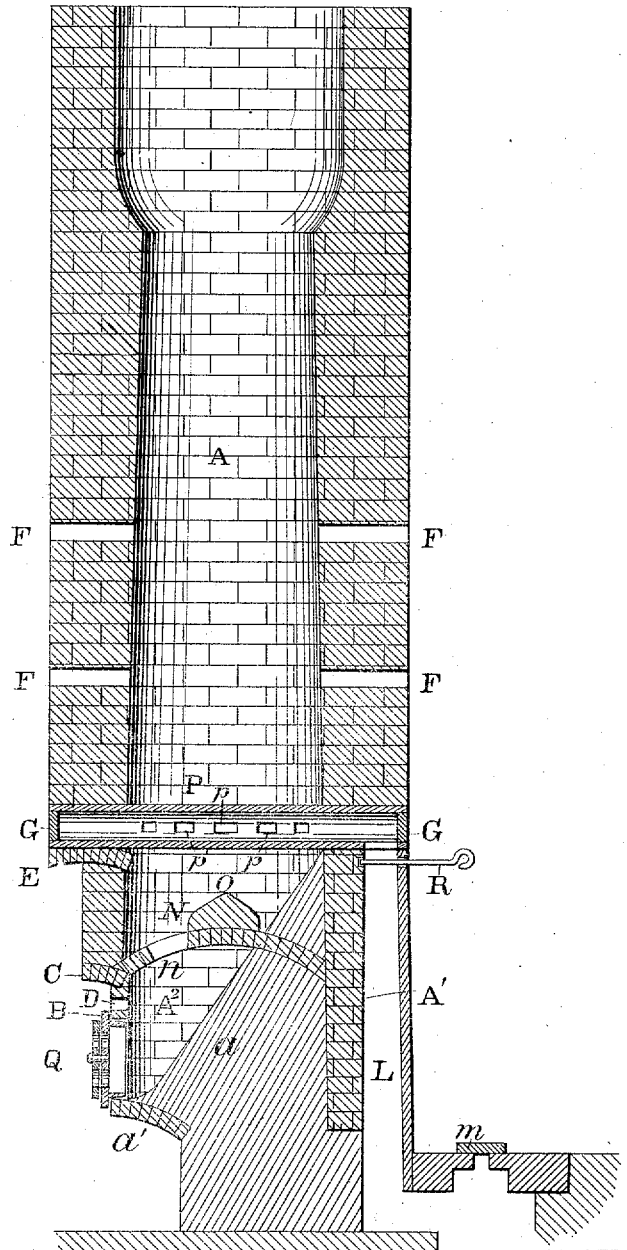
ATTEST:
Jacob Felbel
Robert Blissert
INVENTOR:
John Druecker.
by atty. J. N. McGuire

UNITED STATES PATENT OFFICE.

JOHN DRUECKER, OF CHICAGO, ILLINOIS.

LIMEKILN.

SPECIFICATION forming part of Reissued Letters Patent No. 10,214, dated October 10, 1882.

Original No. 258,725, dated May 30, 1882. Application for reissue filed August 28, 1882.

*To all whom it may concern:*

Be it known that I, JOHN DRUECKER, of Chicago, in the county of Cook and State of Illinois, have invented certain new and useful Improvements in Limekilns; and I do hereby declare that the following is a full, clear, and exact description of the invention, which will enable others skilled in the art to which it appertains to make and use the same, reference being had to the accompanying drawing, which forms a part of this specification, and which represents a vertical section of my improved kiln.

My improvement has relation to kilns for burning lime by gas, the gas being produced from coal-screenings or other material; and it consists in the detailed construction and arrangement of parts of the kiln, as hereinafter more fully described and claimed.

The body of the kiln, (shown at A,) in which the limestone is placed, is preferably oval in cross-section, and is provided with vertical rows of apertures F, through which iron bars may be inserted to poke down the lime as it is burned, and thus prevent choking of the kiln, and through these apertures or loop-holes the stage of the fire within the kiln may be inspected when desired.

Between the body A of the kiln and the discharge-hopper $A^2$ is the horizontal gas-channel P, which has a series of apertures, *p*, for the escape of the gas into the kiln. Gas is fed into the horizontal channel P through a vertical duct, L, which extends down to the gas-holder or gasometer, and which has an aperture, *m*, closed by a single course of brick, for cleaning out the duct when desired.

The lower part of the front wall of the kiln is reduced to form two arches, E and C, the upper arch, E, supporting the body of the front wall, while the lower arch, C, supports one end of a brick arch, N, built at right angles to arches E and C, the other end of which rests in the back wall, A′. Upon this arch is placed a saddle, O, the object of which is to prevent the burned lime from falling down too rapidly through the discharge-opening *n* in the arch by breaking the bulk or body of burned lime as it tumbles down upon the inclined plane *a*, which is built up upon the kiln base or foundation, and has at its front part an arch, *a′*, under which the wheelbarrow may be pushed to receive the lime as it is discharged through the door B. Above the latter is an aperture, D, through which iron bars may be inserted, for the purpose of regulating the discharge of burned line through the door, and the door is provided with a register or draft-hole, Q, for feeding cold air to the kiln in sufficient quantity to burn the gas and cool the burned lime off as it accumulates in the hopper or lower part of the kiln. The flow of gas is regulated by a damper, R, at the upper end of the gas-duct or feed-pipe L.

At each end of the gas-channel P is an opening, G, closed when the kiln is in operation by a single course of brick, by removing which the channel or passage P may readily be cleaned out.

By this construction and arrangement of the kiln I save fuel and provide for the thorough burning of the stone, while the burned lime has sufficient time to cool off after it has passed the gas-channel to make it fit to be dumped directly into the wheelbarrows and taken by them to the cars without requiring rehandling.

What I claim as new, and desire to secure by Letters Patent, is—

1. In combination with the body or cupola of the kiln, the convex bottom or charge-supporting arch N, perforated at *n*, and the saddle *o*, the latter operating to support the central portion of the column of the mass and to deflect the burned lime toward the aperture *n* of the arch N, as set forth.

2. In combination with the hopper A, arched roof N, (having an aperture, *n*,) and the discharge-door B, an aperture, D, entering said hopper above the discharge-door B and beneath the roof N, all substantially as and for the purposes set forth.

3. In combination with the body or cupola A and a suitable source of gas-supply, a perforated gas-channel, P, arranged transversely of the body A, and a vertical duct, L, forming a communication between said gas-channel and said source of gas-supply, all substantially as set forth.

4. In combination with a body portion or cupola having a space arched over at C, and a discharge-door, B, located below said arch, a recess beneath said door, arched as at $a'$, and adapted to permit the placement beneath said arch of a wheelbarrow, as and for the purpose set forth.

5. In combination with the discharge-hopper $A^2$, having an inclined portion, $a$, the discharge-door B, and a register or draft-hole, Q, for the purpose of regulating a supply of cold air to cool the contents of the hopper $A^2$, and then (ascending) pass into the burning mass and assist in the combustion thereof, as set forth.

In testimony whereof I have hereunto set my hand this 22d day of August, 1882.

JOHN DRUECKER.

In presence of—

FREDERICK A. SMITH,
CHARLES F. MOREY.